Sept. 9, 1952    S. BECKWITH ET AL    2,609,988
ELECTRIC ANALOGUE COMPUTER
Filed March 17, 1950    2 SHEETS—SHEET 1

Inventors
Sterling Beckwith
Eldo E. Koenig
by T. Lloyd La Fave
Attorney

Sept. 9, 1952     S. BECKWITH ET AL     2,609,988
ELECTRIC ANALOGUE COMPUTER
Filed March 17, 1950     2 SHEETS—SHEET 2
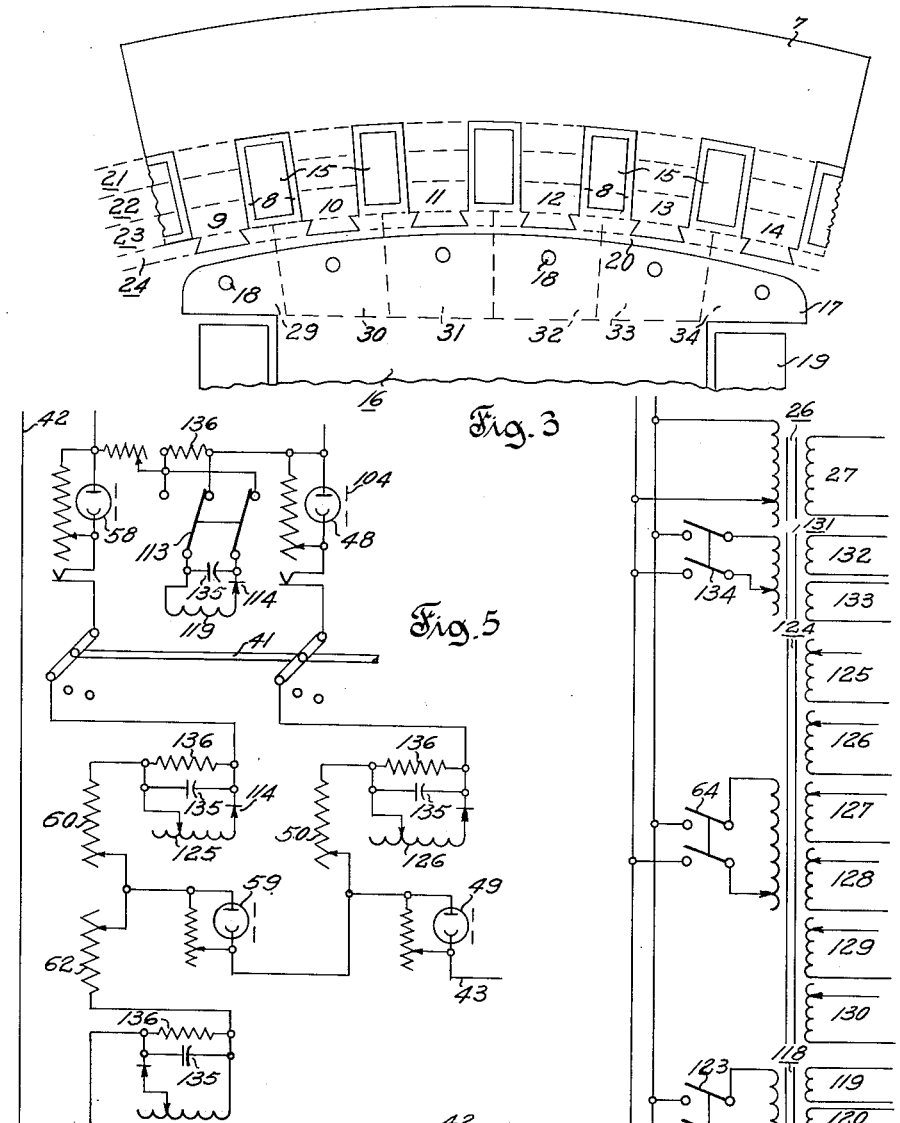
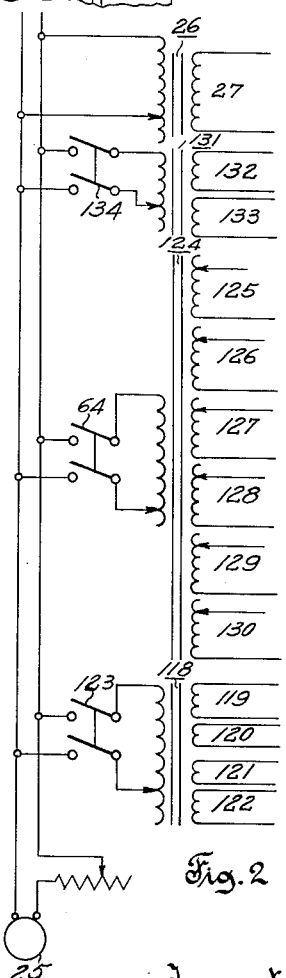
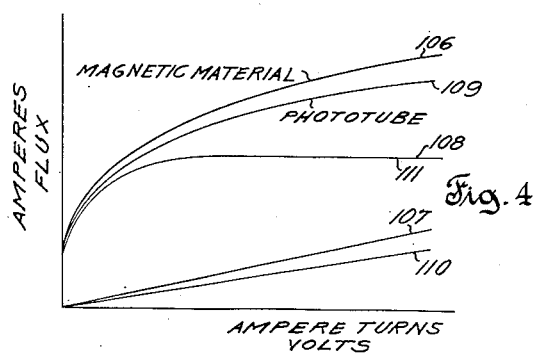
Inventors
Sterling Beckwith
Eldo C. Koenig
by T. Lloyd La Fave
Attorney Patented Sept. 9, 1952

2,609,988

UNITED STATES PATENT OFFICE 2,609,988

ELECTRIC ANALOGUE COMPUTER

Sterling Beckwith, Wauwatosa, and Eldo C. Koenig, Waukesha, Wis., assignors to Allis-Chalmers Manufacturing Company, Milwaukee, Wis.

Application March 17, 1950, Serial No. 150,117

11 Claims. (Cl. 235—61)

This invention relates to an electric analogue computer for the solution of problems involving single valued nonlinear parameters as occur in hydraulics, aerodynamics, mechanical springs, and magnetic circuits. This invention relates more particularly to means and methods involved in an electric analogue circuit usable for determining the saturation characteristics of the magnetic circuit of a salient pole dynamoelectric machine.

The electric analogue circuit comprises adjustable linear and nonlinear resistance elements and sources of variable electromotive force so connected in mesh as to represent the magnetic circuit of a salient pole dynamoelectric machine. The values of the resistance elements and voltages are such as to correspond to known or desired values of the reluctance and magnetomotive force components in the magnetic circuit. The resulting values of the currents in and the voltages across the resistance elements in the electric circuit are thus representative, respectively, of the values of flux and magnetomotive force across corresponding components of the magnetic circuit of the dynamoelectric machine.

The magnetic circuit of a salient pole dynamoelectric machine comprises magnetic material having a nonlinear saturation characteristic, which characteristic heretofore has been an obstacle in accurately representing the magnetic material in an electric circuit.

This disadvantage is obviated by the invention described herein, which provides that nonlinear reluctances of the magnetic material be represented by nonlinear resistance elements each comprising a phototube connected in parallel with a linear resistance element.

It is therefore an object of the invention to provide an electric analogue computer for use in the solution of certain problems involving single valued functions of nonlinear parameters.

Another object of the invention is to provide a magnetic saturation analyzer for determining the saturation characteristics of a magnetic circuit.

Another object of the invention is to provide an electric analogue circuit in which each element has a conductivity characteristic similar to the permeability characteristic of a corresponding portion of the material of the magnetic circuit.

Another object of the invention is to provide a magnetic saturation analyzer for determining saturation characteristics of a dynamoelectric machine for open circuit and various power factor operating conditions thereof.

Other objects and advantages will be apparent from a consideration of the following description taken in connection with the accompanying drawing, in which:

Fig. 1 diagrammatically illustrates the circuit of the analogue computer including phototubes and a plurality of sources of unidirectional voltages, and the connection of the lamps providing illumination for the phototubes;

Fig. 2 diagrammatically illustrates a source of power supplying voltages for the current of Fig. 1;

Fig. 3 is an end view of the portion of the dynamoelectric machine including the armature teeth, air gap and pole piece forming the magnetic circuit represented by the electric analogue of Fig. 1;

Fig. 4 is a graph of the magnetic saturation characteristics of a cube of magnetic material and of the volt ampere characteristic of a phototube shown in Fig. 1;

Fig. 5 shows an alternative means of connecting sources of unidirectional voltages in the circuit of Fig. 1.

Figure 1:
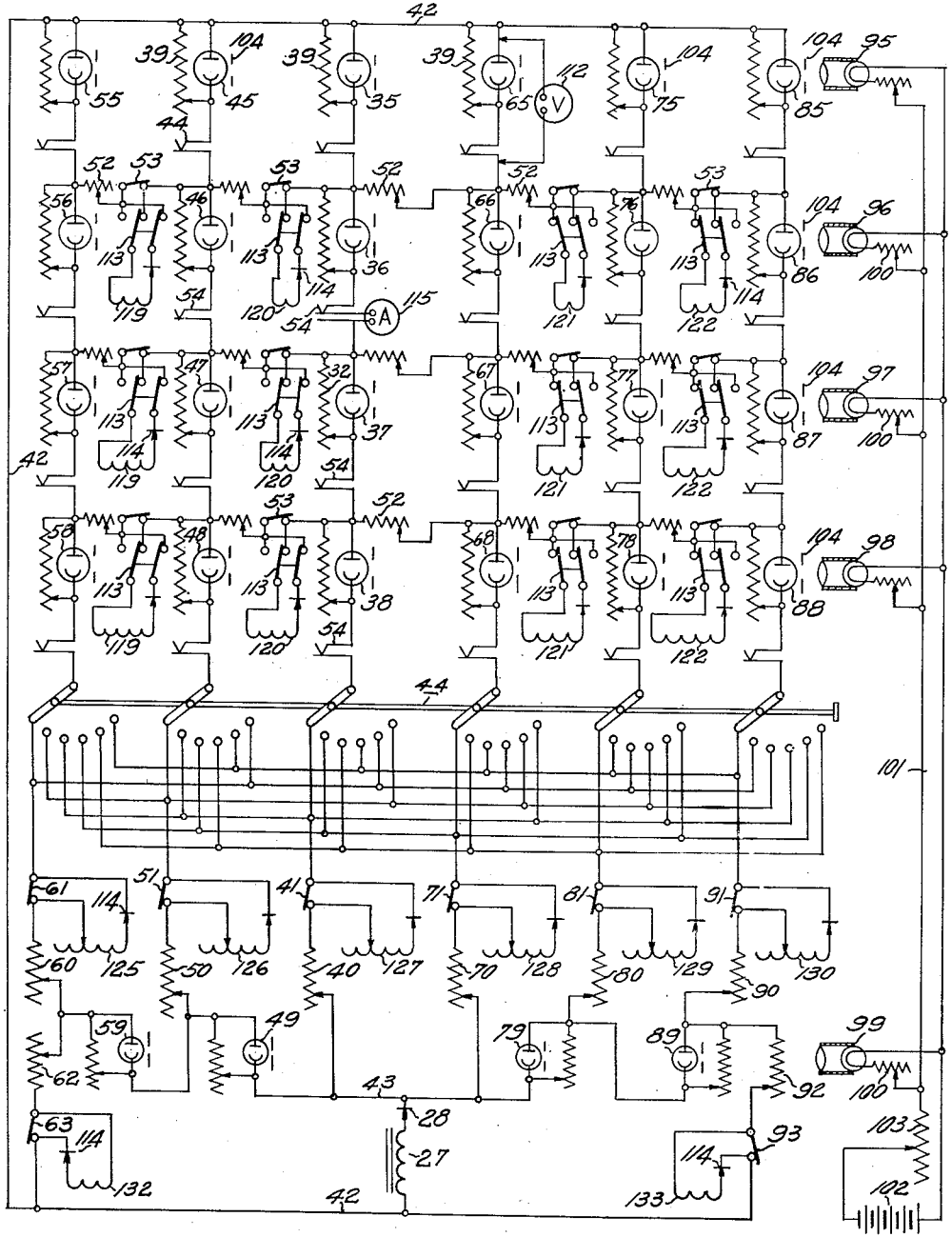

Referring more particularly to Fig. 3 of the drawing, numeral 7 designates a pole pitch portion of the armature core of a dynamoelectric machine, which may have any number of winding slots but which is shown having six teeth 9 to 14 and six slots 8 per pole pitch, the slots 8 containing windings 15. A field pole 16, having a pole head or pole piece 17 with damper windings 18 therein, is provided with a field winding 19. An air gap 20 is formed between the pole piece 17 and the teeth of the armature core. The armature core 7, pole 16, pole piece 17 and the air gap 20 constitute a portion of the magnetic circuit of the dynamoelectric machine which is representative of the other portions of the machine forming similar magnetic circuits.

The magnetic circuit is illustrated as divided by dotted lines into substantially radial segments, each segment including one of the teeth 9 to 14 and corresponding adjacent portions of the air gap and pole piece portions 29 to 34. The dotted lines further subdivide each tooth, from root to tooth tip portion, into circumferential portions 21 to 24.

The magnetic circuit of Fig. 3 extending between the pole and the roots of the armature teeth is represented by the electric circuit of Fig. 1 in which the resistance elements are connected in mesh to represent the corresponding subdivided reluctance portions of the magnetic circuit of the dynamoelectric machine for an open circuit saturation condition thereof.

The electric circuit comprises conductors 42, 43 and a source of suitable unidirectional voltage which may be a battery or any other suitable known source such as a generator 25 supplying alternating current to an adjustable tap transformer 26 which has its secondary winding 27 connected across the circuit through a suitable rectifier 28. The voltage applied across the circuit is adjusted so that its value corresponds to the predetermined value of the magnetomotive force produced by the ampere turns of the field for forcing flux through the air gap, the teeth of the armature and the pole piece for a given no-load operating condition of the machine.

The circuit further comprises linear and nonlinear resistance elements connected in mesh across the winding 27 and rectifier 28. Each nonlinear resistance element comprises a phototube shunted by an adjustable resistor to represent the reluctance of a corresponding portion of the core material. The linear resistance elements comprise adjustable resistors, representing the reluctance of portions of the air gap, and resistors 52 representing the transverse reluctance of the slots of the armature core.

Phototubes 35 to 38 and resistor 40 are connected in series with each other through a contact of a suitable selector switch 44 to form a series circuit between conductors 42, 43, which circuit is designated herein as the first series circuit. Phototubes 35 to 38 and their associated resistors 39 correspond to portions 21 to 24 respectively of tooth 11. Adjustable resistor 40 corresponds to the air gap portion of the radial segment including tooth 11 and the adjacent portion 31 of pole piece 17. This portion of the pole piece is not saturated and its reluctance therefore is constant.

A radial segment including tooth 10 is pole piece portion 30, and the intervening air gap portion represented by a second series circuit comprising phototubes 45 to 48, and adjustable resistor 50 connected in a series circuit between conductors 42, 43 through selector switch 44, a shorting switch 51, and another nonlinear resistance element comprising a phototube 49 and its associated, parallel connected, adjustable resistor 39. Phototube 49 and its associated resistor represent the portion 30 of the pole piece adjacent tooth 10, which may become saturated and therefore have a nonlinear reluctance, particularly where there are damper windings 18 in the pole piece.

Another radial segment, including tooth 9, and pole piece portion 29 is represented by a third series circuit comprising phototubes 55 to 58 and their associated resistors 39, which represent the portions 21 to 24, respectively of tooth 9. These phototubes are connected in series between conductors 42, 43 through selector switch 44 and a shorting switch 61, an adjustable resistor 60 representing the portion of the air gap 20 adjacent tooth 9, phototube 59 with its associated parallel connected resistor 39 representing an adjacent pole tip portion 29 of pole piece 17 which may become saturated, and phototube 49 of the second series circuit. An adjustable resistor 62 is connected through a shorting switch 63 between conductor 42 and the connection of resistor 60 with phototube 59. The right half of the pole pitch portion of the dynamoelectric machine comprising radial segments which include teeth 12, 13, 14 and pole piece portions 32, 33, 34 is a mirror image of the left hand half pole pitch portion, and is similarly represented by fourth, fifth and sixth series circuits having similar elements similarly connected as the first, second, and third series circuits, respectively. The fourth series circuit includes phototubes 65 to 68, and adjustable resistor 70 connected in series between conductors 42, 43. The fifth series circuit includes phototubes 75 to 78, shorting switch 81, adjustable resistor 80, and phototubes 79 connected between conductors 42, 43. The sixth series circuit includes phototubes 85 to 88, shorting switch 91, adjustable resistor 90, phototube 89, and phototube 79, connected between conductors 42, 43. An adjustable resistor 92 is connected, through a shorting switch 93, between conductors 42 and the connection of resistor 90 with phototube 89.

A first group of elements in the electric circuit comprises phototubes 35, 45, 55, 65, 75, and 85, having a common terminal connection with conductor 42, and similarly situated in the first to sixth series circuits, respectively. A second group of elements comprises phototubes 36, 46, 56, 66, 76, and 86, each of which is connected in series with a phototube of the first group of the corresponding series circuit. A third group of elements comprises phototubes 37, 47, 57, 67, 77, 87 and a fourth group comprises phototubes 38, 48, 58, 68, 78, and 88, each of which is connected in series with the corresponding phototubes of the adjacent groups, which phototubes are in corresponding series circuits.

For interconnecting the elements of adjacent series circuits to form a mesh circuit, adjustable resistors 52 are provided to represent slot portions between the teeth of the armature core. A terminal of one of these resistors 52 is connected to the juncture of tubes 55, 56, and the other terminal of this resistor is connected through a shorting switch 53 to the juncture of tubes 45, 46. Similarly, resistors 52 and associated shorting switches 53 interconnect each adjacent pair of series connected phototubes with the corresponding pair of phototubes of the adjacent series circuits, except that shorting switches may be omitted between the first and fourth series circuits, as shown in Fig. 1.

Adjustable means for illuminating the phototubes comprise lamps 95 to 99, each of which is connected through an adjustable resistor 100 to a circuit 101 connected to an adjustable voltage source such as a battery 102 and a series connected adjustable resistor 103. Lamp 95 supplies illumination for the bias of phototubes of the first group, and lamps 96, 97, and 98, supply illumination for the phototubes of the second, third, and fourth groups, respectively. Lamp 99 supplies illumination for phototubes 49, 59, 79, and 89.

Means are provided for simultaneously varying the illumination of all the phototubes 35, 45, 55, 65, 75, 85, of the first group independently of the illumination of the phototubes of the other groups such as the adjustable resistor 100 connected in series with lamp 95 for varying the energization of lamp 95. Similarly, the illumination of all the phototubes of each of the other groups may be varied simultaneously, independently of that of the other groups, by adjustment of the resistor 100 associated with the lamp supplying illumination to the group.

Means are provided for simultaneously varying the illumination of all of the phototubes, such as resistor 103 which is adjusted to vary the voltage of circuit 101, and, therefore, the voltage across each of the lamps 95 to 99.

Figure 6:
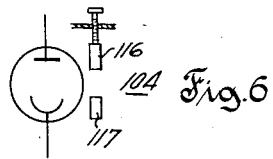
Fig. 6 shows an adjustable shutter for a phototube of Fig. 1.

Means are provided for varying the illumination supplied to each phototube, independently of that supplied to other phototubes, such as a suitable known adjustable shutter 104, comprising relatively movable shutters 116, 117, Fig. 6, disposed between each phototube and the lamp from which it derives its illumination.

In operation of the analyzer for determining the saturation characteristics of the magnetic circuit of a dynamoelectric machine, the resistors are adjusted so that their relative values are proportional to the known or desired relative values of corresponding reluctances of the magnetic circuit portions which they represent. For example, the reluctance of the root portion 21 of a tooth is less than the reluctance of an intermediate portion 23 because of tapering of the teeth. Similarly, the reluctance of a tooth tip portion 24, where the slot wedge notch further reduces the cross section, is proportionately greater than the reluctance of other portions of the tooth.

Therefore, the series connected nonlinear resistance elements such as phototubes 35 to 38, are adjusted to provide resistances in the series circuit to correspond to the relative reluctances of the corresponding portions of tooth 11. Similarly, the resistor 40 is adjusted to provide resistance corresponding to the relative reluctance of the air gap portion adjacent tooth 11. The nonlinear resistance element comprising phototube 59 is adjusted to provide a resistance representing the reluctance of the corresponding pole tip portion 29 adjacent tooth 9. The reluctance of this pole tip portion varies with respect to the rest of the pole piece because of the greater saturation thereof. If saturation exists in pole piece portions 31, 32 they can also be represented by nonlinear resistance elements as are pole piece portions 29 and 34.

In order to adjust a nonlinear resistance element of the electric circuit to provide resistance proportional to the reluctance of the corresponding portion of the magnetic circuit, the nonlinear resistance element comprising a phototube and a parallel connected resistor must have a conductivity characteristic which corresponds to the permeability characteristic of the magnetic material. Curve 106, Fig. 4, represents the flux versus ampere-turn characteristic or saturation characteristic of a unit cube of the magnetic material of the dynamoelectric machine. Curve 106 may be considered to be obtained by adding the ordinates of an intrinsic linear characteristic 107, to those of an intrinsic nonlinear characteristic 108.

Curve 109, Fig. 4, represents the ampere-volt characteristic or conductivity characteristic of a phototube such as an R. C. A. type 922 phototube. This characteristic may be considered to be obtained by adding the ordinates of an intrinsic linear characteristic 110 to those of an intrinsic nonlinear characteristic 111.

Curve 108, the intrinsic nonlinear characteristic of the magnetic material and curve 111, the intrinsic nonlinear characteristic of the phototube, are caused to coincide, in Fig. 4, by suitable choice of units. Drawn to these units, the saturation characteristic 106 differs from the conductivity characteristic 109 by the difference between their intrinsic linear characteristics, curves 107 and 110 shifting curve 109 by the difference between the ordinates of 107 and 110, will make curve 109 coincide with curve 106. Therefore, the addition of a resistor having a conductivity characteristic determined by the difference between curves 107 and 110 connected across the phototube will make a resistance element having a conductivity characteristic corresponding to the permeability characteristic of the magnetic material.

When the values of the resistance of the resistance elements and the voltages impressed on the circuit are properly proportioned to correspond to the components of the magnetic circuit, then readings of the values of currents in the resistance elements indicate the corresponding distribution of flux in the magnetic circuit; readings of voltages across elements indicate the corresponding magnetomotive force distribution in the magnetic circuit. Current readings are obtained by connecting an ammeter 115 at different points in the electric circuit. The ammeter is shown connected in series with phototubes 36, 37, by means of one of the jack switches 54 provided between the series connected phototubes. The voltages may be obtained by use of a suitable known voltmeter 112, preferably a potentiometer type voltmeter which is connected to draw no current from the analogue circuit, shown as connected across phototube 65.

For analyzing the saturation characteristics of a magnetic circuit of a dynamoelectric machine operating at zero power factor, lagging, the magnetomotive force in the magnetic circuit which produces cross flux between adjacent teeth of increasing magnitude between root and tip of each tooth, due to currents in slot conductors, is represented in the electric circuit by corresponding voltages which produce currents in resistors 52 between corresponding portions of adjacent series circuits. These voltages may be supplied from suitable batteries or, as shown, from generator 25 through adjustable voltage transformers 118, one for each group of phototubes.

Each transformer 118 comprises secondary windings 119 to 122 which are separately wound to prevent leakage currents therebetween. Each winding 119 to 122 is connected across the terminals of a polarity reversing switch 113 through a suitable half wave rectifier 114. The switches 113 may be closed to the left or to the right to connect the secondary windings 119 to 122 across the terminals of corresponding shorting switches 53. Shorting switches 53 are opened and switch 123 closed to connect transformer 118 with generator 25.

For zero power factor lagging analysis, all of the shorting switches 53 are opened. The windings 119 and 120 are connected across the terminals of corresponding shorting switches 53 by means comprising associated reversing switches 113 which are closed to the right so that the currents supplied by these windings flow in the same direction between circuits, from the first series circuit to the second, and from the second series circuit to the third. The windings 121 and 122 are also connected by their associated reversing switches 113 which are closed to the left so that currents therefrom flow in the same direction between series circuits from the fourth to the fifth series circuits and from the fifth to the sixth series circuits.

The relative values of the voltages supplied by windings 119 to 122 of one group represent the corresponding magnetomotive forces in the magnetic circuit due to currents in the slot conductors. The magnetomotive force due to current in the armature windings acting across the teeth is distributed as a sine wave, one half wave extending over one pole pitch portion of the core; at zero power factor the sine wave goes through zero opposite the center of the pole with a positive quarter wave assumed on the left half and a negative quarter wave on the right half of the pole pitch portion of the core, the center of the pole pitch portion of the core being between teeth 11 and 12. Therefore, secondary windings 119 to 122 vary in relative ampere-turns so that the values of the voltages thereof will appear as a sine wave of voltage distributed across the circuit representing the pole pitch portion as the sine wave of magnetomotive force in the armature slots.

Means comprising the adjustable voltage tap of the primary winding of each transformer 118 provide simultaneous adjustment of the voltages of the secondary windings 119 to 122 of one group independently of the voltages of the other groups.

The current in the armature windings also produces different magnetomotive forces across the air gap portions extending between the different teeth and the pole piece. At zero power factor lagging, the armature magnetomotive force is sinusoidally distributed across the pole pitch with maximum value at the center line of the pole and opposes the field magnetomotive force. The relative magnitudes of these additional magnetomotive forces due to aramature current are a function of the currents flowing in the armature conductors.

These additional magnetomotive forces are represented in the electric circuit by an additional voltage source in each series circuit, which source may comprise a battery, or, as shown, an adjustable voltage transformer 124. Transformer 124 has an adjustable tap primary winding which may be connected to generator 25 by means of a switch 64. Transformer 124 has adjustable tap, separately wound, secondary windings 125 to 130, each of which is connected across a shorting switch through a rectifier 114. Shorting switches 41, 51, 61, 71, 81, and 91, shown closed, are opened and transformer switch 64 is closed so that the voltages of windings 125 to 130 appear across the terminal of shorting switches 61, 51, 41, 71, 81, and 91, respectively.

The adjustable voltage tap of the primary winding of transformer 124 provides means for simultaneously varying the amplitude of the voltages of windings 125 to 130. These secondary windings 125 to 130 are independently adjusted so that the relative magnitudes of their voltages will be distributed as the inverted half of a sine wave across the pole pitch to correspond to the sine wave of magnetomotive forces which they represent. The direction and magnitude of these voltages are such that they add to the value of the voltage from winding 27, so that the sum of such voltages represent corresponding resultant magnetomotive forces across the armature and pole piece due to currents in both armature and field windings.

The total field magnetomotive force required to drive the flux crossing the air gap through the armature teeth and pole piece for zero power factor, lagging operation of the dynamoelectric machine is represented by the voltages supplied from transformers 26 and 131, the latter connected to generator 25 through a switch 134. Secondary windings 132 and 133 of transformer 131 are each connected through a half wave rectifier 114 to the terminals of shorting switches 63 and 93 which are opened and switch 134 is closed for adding a unidirectional voltage between circuit conductor 42 and resistor 62 and between conductor 42 and resistor 92 to supply additional current through resistors 62 and 92 in the same direction therethrough as current supplied from winding 27.

Readings of the values of the currents in, and voltages across the resistance elements of the electric circuit indicate proportionate values of fluxes in, and magnetomotive forces across corresponding reluctance elements in the magnetic circuit for zero power factor, lagging, operating condition of the dynamo-electric machine. The distribution of such values represents the corresponding distribution in the magnetic circuits.

For other power factor conditions of operation of the dynamoelectric machine, the saturation conditions of the magnetic circuit can be analyzed by the electric analogue circuit shown in Fig. 1, taking into consideration the changes in the magnetic circuit due to the changes in the currents in the armature windings. The voltages in the electric circuit would be changed to represent the change in magnetomotive forces in the magnetic circuit. The sine wave of magnetomotive force distribution is transposed so that the zero value of magnetomotive force is moved to the left or to the right one or more tooth pitch portions according to the power factor condition of operation.

Such transposition of the sine wave of magnetomotive force may be considered as relative displacement of the pole with respect to the armature. The portions of the pole will then be adjacent different armature teeth. The selector switch 41 provides means for reconnecting the portions of the series circuits representing the armature teeth with the corresponding portions of the electric circuit representing the portion of the pole then adjacent the teeth. Thus, moving selector switch one tap position to the right, representing movement of he armature one tooth pitch to the right of the pole one tooth pitch to the left for another lagging power factor condition, connects phototube 58 with winding 126 and resistor 50; phototube 48 with resistor 40; phototube 38 with resistor 70; phototube 68 with winding 127 and resistor 80; phototube 78 with winding 128 and resistor 90; and phototube 88 with winding 125 and resistor 60. Reversing switches 113 between series circuits five and six are reversed, being moved from the position shown, closed to the left, to a closed position to the right.

Movement of the selector switch, through all positions, to the extreme right, effectively moves the pole to the left from the initial zero power factor lagging position, through unity power factor position, to zero power factor leading position. If the dynamoelectric machine is a generator, its field must be considered as rotating counterclockwise; if the dynamoelectric machine is a motor, its field must be considered as rotating clockwise; or from zero power factor lagging position to unity power factor position, for clockwise rotation of the rotor, the rotor pole is moved in the direction of rotation if the dynamoelectric machine is a generator, and the rotor pole is moved in the opposite direction if the dynamoelectric machine is a motor.

For a power factor near unity, the selector switch is moved to the fourth contact position, counting from the left, and the reversing switches 113 are all closed to the right so that the direction of flow of current in resistors 52 is to the left between circuits, from the sixth to the first series circuits.

For zero power factor, leading, the selector switch may be positioned as shown, and the reversing switches 113 closed in the opposite direction shown. The windings 125 to 130 are adjusted to effect the upright position of the half wave of sine wave of voltage, so that the sum of the voltages of windings 125 to 130 and of winding 27 represent the resultant magnetomotive forces across the armature and pole piece due to both armature and field currents.

In Fig. 5 is illustrated the use of a resistor 136, in lieu of a shorting switch 53, connected in series with adjustable resistor 52 between phototubes of adjacent series circuits. Resistors 136 are connected across the secondary windings 119 to 122 through reversing switches 113, to supply voltages in the circuit, when switch 123 is closed, to represent cross flux between adjacent teeth. A capacitor 135 may be inserted across each secondary winding and associated rectifier 114 for smoothing out the rectified wave.

Similarly, resistors 136 shunt secondary windings 125 to 130, 132 and 133 in lieu of shorting switches 61, 51, 41, 71, 81, 91, 63 and 93, respectively. A capacitor 135 may be connected across each winding 125 and 130, 132 and 133.

Although but two embodiments of the invention have been shown and described, it will be apparent to those skilled in the art that the electric analogue circuit is applicable to other problems than the magnetic circuit of a dynamoelectric machine, and that various changes and modifications may be made to the embodiments without departing from the spirit of the invention or from the scope of the appended claims.

It is claimed and desired to secure by Letters Patent:

1. A magnetic saturation analyzer for the magnetic circuit of a salient pole dynamoelectric machine for determining saturation characteristics thereof, said analyzer consisting of a mesh electric circuit comprising a plurality of series circuits connected in parallel to a source of direct current, each said series circuit comprising a linear resistance element, a plurality of nonlinear resistance elements having values proportional to the reluctances of corresponding portions of said magnetic circuit to the flow of through flux, and another linear resistance element cross connected between a nonlinear resistance element of one series circuit and a corresponding nonlinear resistance element of an adjacent series circuit, said cross connected element having a value proportional to the reluctance of a corresponding portion of said magnetic circuit to the flow of cross flux.

2. A magnetic saturation analyzer for the magnetic circuit of a salient pole dynamoelectric machine for determining saturation characteristics thereof, said analyzer comprising linear and nonlinear resistance elements interconnected to form an electric mesh circuit substantially the equivalent of the magnetic circuit of said machine, said mesh circuit comprising a first group of nonlinear resistance elements having a common terminal, a cross circuit comprising a first linear resistance element in series with a first source of unidirectional voltage connected between adjacent said nonlinear resistance elements of said first group, a second group of nonlinear resistance elements of which each is connected in series with a nonlinear resistance element of said first group, a group of linear resistance elements of which each is connected in series with a nonlinear resistance element of said second group, a second source of unidirectional voltage connected in series between one of said linear resistance elements of said group of linear resistance elements and one of said nonlinear resistance elements of said second group, a third source of unidirectional voltage connected across said groups of resistance elements, means for varying the values of said resistance elements and said voltages, and means for measuring the current in any given resistance element in said mesh circuit which current is indicative of the flux in the corresponding portion of the magnetic circuit.

3. A magnetic saturation analyzer for determining the magnetic flux in the components of a magnetic circuit, said analyzer comprising an electric circuit including a plurality of phototubes, means for illuminating said phototubes, means for adjusting the illumination of said phototubes for obtaining a predetermined volt-ampere characteristic representing the reluctance characteristic of a corresponding portion of said magnetic circuit, a plurality of series circuits connected in parallel across a source of unidirectional voltage, each said series circuit comprising one of said phototubes, a cross circuit comprising a variable linear resistor and a second source of variable unidirectional voltage connected between phototubes of adjacent said series circuits, means for adjusting said resistor to represent the linear reluctance of another portion of said magnetic circuit opposed to the flow of cross flux, and means for adjusting said voltages for representing magnetomotive forces in said magnetic circuit.

4. A magnetic saturation analyzer for determining the magnetic flux in the components of a magnetic circuit, said analyzer comprising an electric circuit including a plurality of groups of phototubes and a group of variable resistors, means for illuminating said phototubes, means for simultaneously varying the illumination of one said group independently of the other said groups for representing the nonlinear reluctances of parallel portions of said magnetic circuit, a plurality of series circuits connected in parallel to a source of unidirectional voltage, each said series circuit comprising corresponding phototubes of each said group connected in series with each other and with one of said variable resistors, and another source of variable unidirectional voltage connected between one of said resistors and the adjacent connected said phototube, means for adjusting each said resistor to represent other portions of said magnetic circuit, and means for adjusting said voltages for representing magnetomotive forces in said magnetic circuit.

5. A magnetic saturation analyzer for determining the saturation characteristics of a magnetic circuit of a dynamoelectric machine having a core provided with teeth and a salient pole provided with tips, said analyzer comprising a source of unidirectional voltage to represent the magnetomotive force across the magnetic circuit, a plurality of circuits, each said circuit comprising a plurality of series connected nonlinear resistance elements having values representing the reluctance of portions of a core tooth from the root to the tip thereof, a linear resistance element in series with said nonlinear resistance elements dimensioned to represent the reluctance of a portion of the air gap, one of said circuits connected across said source, another nonlinear resistance element dimensioned to represent the nonlinear reluctance of a pole tip, said second circuit connected in parallel with said first circuit through said other nonlinear resistance element, and means for measuring the voltage across and current through any given resistance element in said circuit.

6. An electric analogue computer for solving single valued functions of nonlinear parameters, said computer comprising an electric circuit including a plurality of phototubes connected in groups, means for illuminating said phototubes, means for simultaneously varying the illumination of all said phototubes, means for simultaneously varying the illumination of the phototubes of one of said groups independently of the illumination of the other said phototubes, means for varying the illumination of each phototube independently of the illumination of the other said phototubes, a plurality of series circuits connected in parallel to a first source of variable voltage, each said series circuit comprising a phototube of each said group, said electric circuit also comprising a plurality of adjustable resistors, a plurality of blocking rectifiers and a plurality of other sources of variable voltages, each of said resistors connected through one of said rectifiers and one of said other sources of voltages between adjacent said phototubes of one of said groups, and means for adjusting said resistors, means for varying said voltages; whereby the values of the resistances and voltages in said electric circuit correspond to the values of the components of the nonlinear parameters.

7. A magnetic saturation analyzer for the magnetic circuit of a salient pole dynamoelectric machine for determining saturation characteristics thereof, said analyzer comprising linear and nonlinear resistance elements dimensioned and interconnected to form an electric mesh circuit substantially the equivalent of the magnetic circuit of said machine, said mesh circuit comprising a plurality of groups of similarly connected linear and nonlinear resistance elements and sources of unidirectional voltage, said nonlinear resistance elements of a first said group connected to a common terminal, adjacent said nonlinear resistance elements of said first group connected in parallel through one of said linear resistance elements of said first group, switch means for connecting said one of said linear resistance elements of said first group in series with one of said sources of unidirectional voltage; each corresponding said nonlinear resistance element of succeeding said groups connected in series with each other and the corresponding said nonlinear resistance element of said first group; a group of additional linear resistance elements of which each is connected in series with corresponding series connected nonlinear resistance elements, a group of additional sources of unidirectional voltage and switch means for connecting one of said additional sources of voltage in series between one of said additional linear resistance elements and said corresponding series connected nonlinear resistance elements, a main source of unidirectional voltage connected across said series connected resistance elements and said additional source of unidirectional voltage, means for simultaneously varying the values of the voltages of all said groups, means for simultaneously varying the values of the voltages of one said group independently of the values of the voltages of the other said groups, and means for varying the value of said resistance elements; whereby the saturation characteristics of said dynamoelectric machine may be analyzed for open circuit and power factor conditions.

8. A magnetic saturation analyzer for determining the flux in the components of a magnetic circuit, said analyzer comprising an electric circuit including a plurality of series circuits connected in parallel to a source of unidirectional voltage, each said series circuit comprising a phototube, each adjacent pair of phototubes of adjacent said series circuits having another source of unidirectional voltage connected therebetween, means for simultaneously varying the values of said other voltages in a sine wave space distribution to correspond to the sine wave distribution of ampere-turns in said magnetic circuit.

9. An electric analogue computer for solving single valued nonlinear parameters, said computer comprising an electric circuit including a source of electric current, a phototube, a resistance element and an electric meter, said phototube being connected in parallel with said resistance element across said source, said element having the value required for producing one of said nonlinear parameters, and means connecting said meter in said circuit for measuring an electrical characteristic of said circuit.

10. A magnetic saturation analyzer for determining the flux in the components of a magnetic circuit, said analyzer comprising an electric circuit including a plurality of series circuits connected in parallel to a source of unidirectional voltage, each said series circuit comprising a nonlinear resistance element, a linear resistance element and another source of unidirectional voltage connected in series with said resistance elements, and means for simultaneously varying the values of said other voltages in a sine wave space distribution to correspond to the sine wave distribution of ampere turns in said magnetic circuit.

11. A magnetic saturation analyzer for the magnetic circuit of a salient pole dynamoelectric machine for determining saturation characteristics thereof, said analyzer comprising an electric circuit including linear resistance elements of values representing the linear reluctances of portions of the air gap in said magnetic circuit, nonlinear resistance elements of values representing the nonlinear reluctances of portions of the magnetic material in said magnetic circuit, each said nonlinear resistance element including a phototube connected in parallel with an adjustable resistor for changing the volt-ampere characteristic of the nonlinear resistance element, a source of electromotive force of value representing the magnetomotive force impressed on said magnetic circuit, said resistance elements connected in series circuits across said source of electromotive force to represent said magnetic material and said air gap disposed in series across said source of magnetomotive force, an electric meter, and means connecting said meter in said electric circuit for measuring the currents in said electric circuit which represent corresponding magnetic fluxes in said magnetic circuit.

STERLING BECKWITH.
ELDO C. KOENIG.

(References on following page)

REFERENCES CITED

The following references are of record in the file of this patent:

UNITED STATES PATENTS

| Number | Name | Date |
|---|---|---|
| 1,653,694 | Branson | Dec. 27, 1927 |
| 2,047,665 | Biggs | July 14, 1936 |
| 2,509,042 | McIlroy | May 23, 1950 |

OTHER REFERENCES

"Hydraulic Analysis of Water Distribution Systems by Means of an Electric Network Analyzer," by T. R. Camp and H. L. Hazen; M. I. T. Publication No. 110, June 1935.

"RCA Receiving Tube Manual"; Tube Dept., Radio Corp. of America; 1950; page 267; circuit No. 16-4.